(12) United States Patent
Ford

(10) Patent No.: US 6,761,409 B2
(45) Date of Patent: Jul. 13, 2004

(54) HEAD RESTRAINT GUIDE SLEEVE

(76) Inventor: John R. Ford, 270 Woodridge, Tecumseh, Ontario (CA), N8N 3A4

(*) Notice: Subject to any disclaimer, the term of this patent is extended or adjusted under 35 U.S.C. 154(b) by 62 days.

(21) Appl. No.: 10/138,387

(22) Filed: May 3, 2002

(65) Prior Publication Data

US 2003/0205925 A1 Nov. 6, 2003

(51) Int. Cl.⁷ .................................................. A47C 1/10
(52) U.S. Cl. ....................................................... 297/410
(58) Field of Search ................................ 297/391, 410, 297/440.1, 397, 404, 463.1, 440.24; 403/348, 349

(56) References Cited

U.S. PATENT DOCUMENTS

| | | | |
|---|---|---|---|
| 4,427,233 A | 1/1984 | Matumoto | |
| 4,527,834 A | 7/1985 | Zyngier | |
| 4,545,618 A | 10/1985 | Kitamura | |
| D282,522 S | * 2/1986 | Meeks | D8/71 |
| 4,657,425 A | 4/1987 | Takahashi | |
| 4,854,642 A | 8/1989 | Vidwans et al. | |
| 5,445,434 A | 8/1995 | Kohut | |
| 5,667,276 A | * 9/1997 | Connelly et al. | 297/410 |
| 5,788,250 A | 8/1998 | Masters et al. | |
| 5,816,658 A | 10/1998 | Wallis | |
| 5,860,703 A | * 1/1999 | Courtois et al. | 297/410 |
| 5,927,813 A | 7/1999 | Nemoto | |
| 6,062,645 A | * 5/2000 | Russell | 297/410 |
| 6,099,077 A | 8/2000 | Isaacson | |
| 6,296,316 B1 | 10/2001 | Hann | |

* cited by examiner

*Primary Examiner*—Peter M. Cuomo
*Assistant Examiner*—Stephen Vu
(74) *Attorney, Agent, or Firm*—Clark Hill PLC

(57) ABSTRACT

A guide sleeve receives and supports a guide post of a bead restraint within a seat back frame of a seat assembly. The guide sleeve includes a body extending between opposite upper and lower ends. A bare defined by cylindrical inner walls extends longitudinally through the guide sleeve for slidably receiving the guide post therethrough for allowing selective adjustment of the head restraint relative to the seat back between a plurality of head supporting positions. A plurality of rings project outwardly from the body and are deformable against the seat back frame during insertion of the guide sleeve into a hole or tube formed in the seat back frame for creating a interference fit between the guide sleeve and the seat back frame without deforming the bore, and thereby, not increasing efforts required to slide the guide post through the bore during movement of the head restraint between the plurality of head supporting positions.

6 Claims, 3 Drawing Sheets

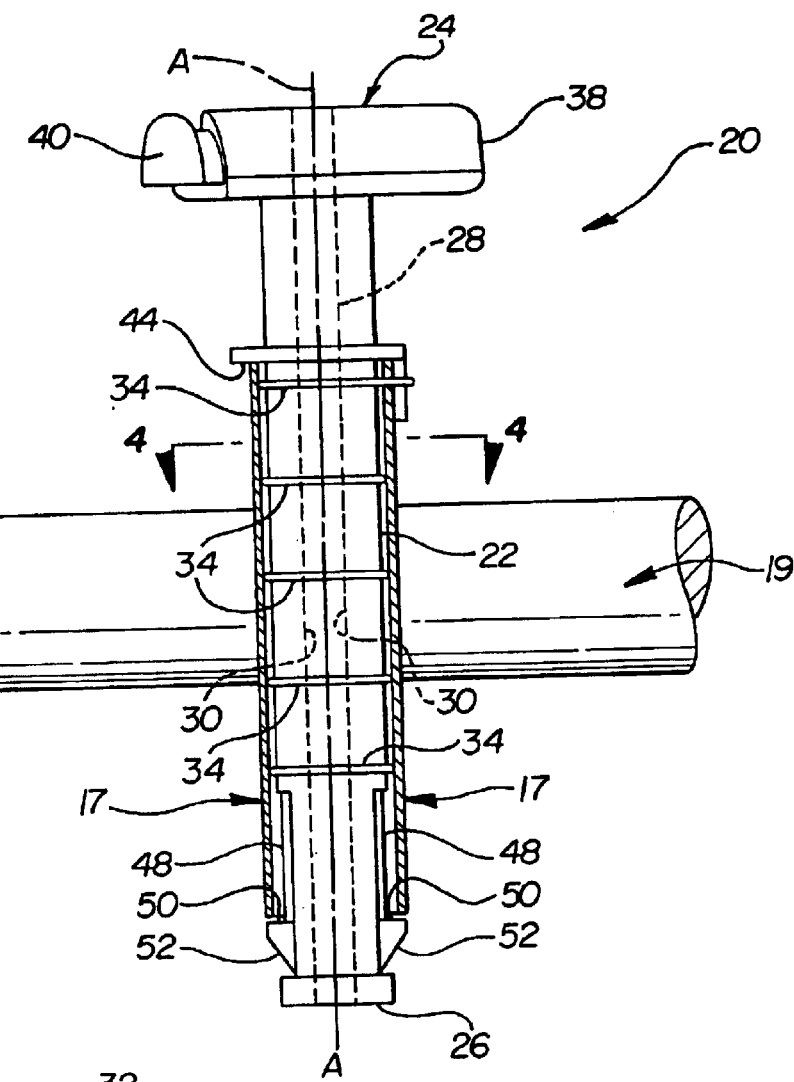
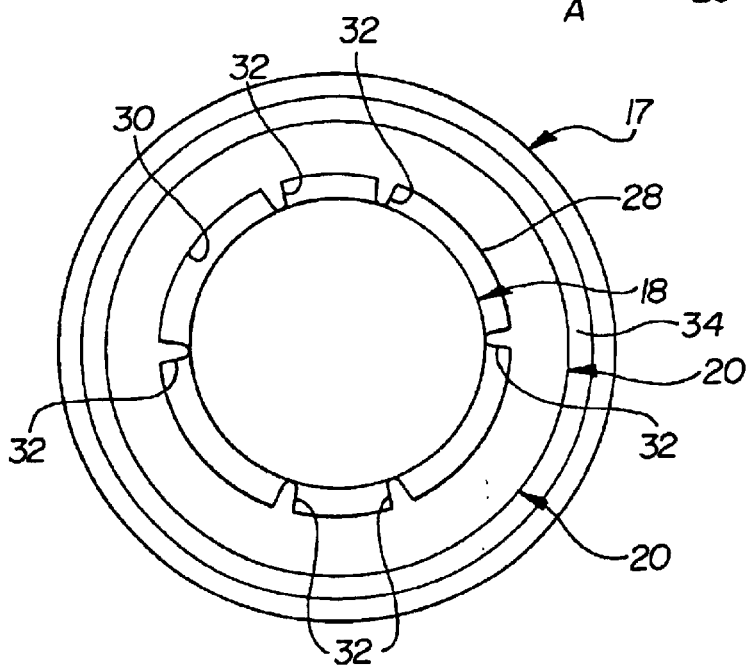

HEAD RESTRAINT GUIDE SLEEVE

BACKGROUND OF THE INVENTION

1. Field of the Invention

The invention relates to head restraint guide sleeves for slidably supporting a head restraint of a seat assembly for an automotive vehicle.

2. Description of the Prior Art

Automotive vehicles include seat assemblies for supporting occupants within the vehicle. Seat assemblies typically include a seat cushion and a seat back operatively coupled to the seat cushion for pivotal adjustment of the seat back relative to the seat cushion between a plurality of reclined seating positions. Seat assemblies also typically include an adjustable head restraint for supporting the head of an occupant seated on the seat assembly. The head restraint is typically movable between a plurality of head support positions relative to the seat back to accommodate a range of occupant heights.

It is widely practiced in the seating art to support the head restraint at the top of the seat back with a parallel and spaced apart pair of rigid guide posts. Each of the guide posts extends from the head restraint through a corresponding pair of holes in the seat back. More specifically, a guide sleeve is inserted into each of the holes. Each guide sleeve includes a longitudinal bore extending axially through the sleeve for slidably receiving a guide post therethrough. A plurality of notches is arranged longitudinally along one or both of the guide posts representing the corresponding plurality of head support positions. A pin, engagable with any one of the plurality of notches to maintain the head restraint in the corresponding head support position, is operatively coupled with the guide sleeve for movement in and out of engagement with the plurality of notches. The pin is spring biased into engagement with the plurality of notches. An example of such a typical head restraint guide sleeve is shown in U.S. Pat. No. 6,099,077, which issued to Isaacson on Aug. 8, 2000.

In use, while the vehicle is being driven, it is common for buzzing, squeaking or rattling noises or "BSR" to occur at the interfaces of the guide sleeves, the guide posts, and the seat back. It is known to include longitudinal ribs extending generally radially outwardly from the outer periphery of the sleeve to minimize BSR between the guide sleeve and the seat back. An example of such ribs is shown in the U.S. Pat. No. 6,296,316 B1, which issued to Hann on Oct. 2, 2001. Similarly, it is known to include longitudinal ribs extending generally radially inwardly from the inner walls of the longitudinal bore to minimize BSR between the guide sleeve and guide post. An example of such ribs is shown in the U.S. Pat. No. 5,788,250, which issued to Masters et al. on Aug. 4, 1998. While longitudinal ribs are effective at minimizing BSR between the guide sleeve, guide post and seat back, it has been shown that such longitudinal ribs often result in higher efforts required to move the head restraint between the plurality of head support positions. The higher efforts are due in large part to unfavorable dimensional tolerance conditions ultimately resulting in excessive interference between the guide sleeve and the guide post.

Accordingly, it remains desirable to provide a head restraint guide sleeve design that minimizes BSR without sacrificing the desire for low head restraint adjustment efforts.

SUMMARY OF THE INVENTION

A guide sleeve is provided for receiving and supporting a guide post of a head restraint within a seat back frame of a seat assembly. The guide sleeve includes a body extending longitudinally between opposite upper and lower ends and a bore defined by cylindrical inner walls extending between the upper and lower ends of the body for slidably receiving the guide post therethrough for allowing selective adjustment of the head restraint relative to the seat back between a plurality of head supporting positions. A plurality of rings each projects circumferentially outwardly from the body and are deformable against the seat back frame during insertion of the guide sleeve into a hole formed in the seat back frame for creating an interference fit between the guide sleeve and the seat back frame without deforming the bore, and thereby, not increasing efforts required to slide the guide post through the bore during movement of the head restraint between the plurality of head supporting positions.

BRIEF DESCRIPTION OF THE DRAWINGS

Advantages of the present invention will be readily appreciated as the same becomes better understood by reference to the following detailed description when considered in connection with the accompanying drawings wherein:

FIG. 3 is a side view of the head restraint guide sleeve; and

FIG. 4 is a cross sectional view taken along line 4—4 of FIG. 3 of the head restraint guide sleeve.

DETAILED DESCRIPTION OF THE PREFERRED EMBODIMENT

Figure 1:
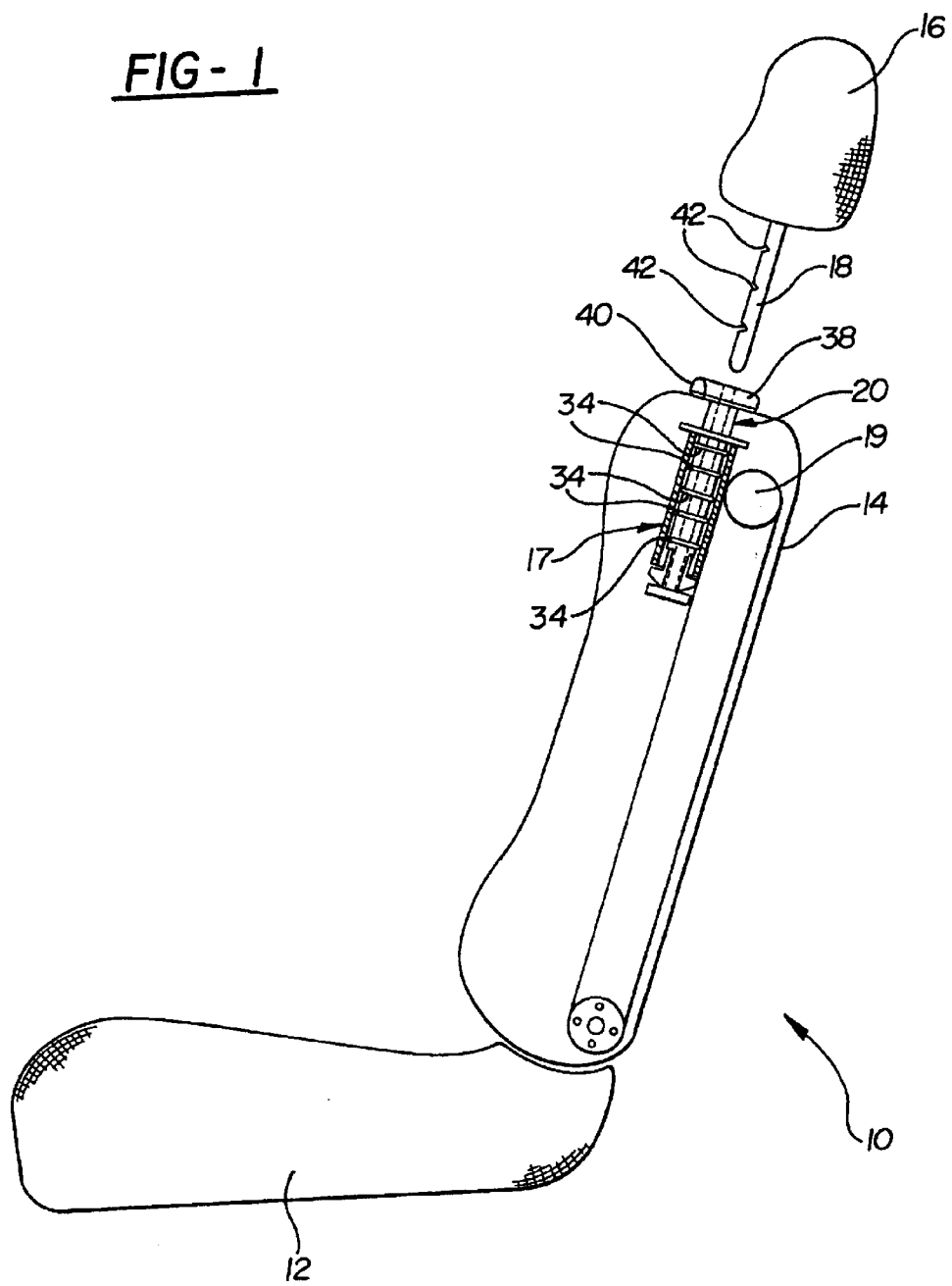
FIG. 1 is side view of a seat assembly for an automotive vehicle incorporating a head restraint guide sleeve according to one embodiment of the present invention.

Referring to the figures, FIG. 1 illustrates a seat assembly 10 for an automotive vehicle incorporating an embodiment of the present invention. The seat assembly 10 includes a seat cushion 12 and a seat back 14 operatively coupled to the seat cushion 12 for providing selective adjustment of the seat back 14 relative to the seat cushion 12 between a plurality of reclined seating positions. A head restraint 16 is supported at the top of the seat back 14 for supporting the head of an occupant seated in the seat assembly 10. Described in greater detail below, a pair of parallel and spaced apart guide posts 18 each extend generally vertically from the head restraint 16 through a corresponding cylindrical guide tube 17 fixedly secured to an upper cross member 19 of the seat back 14 for providing adjustment of the head restraint 16 between a plurality of head supporting positions.

Figure 2:
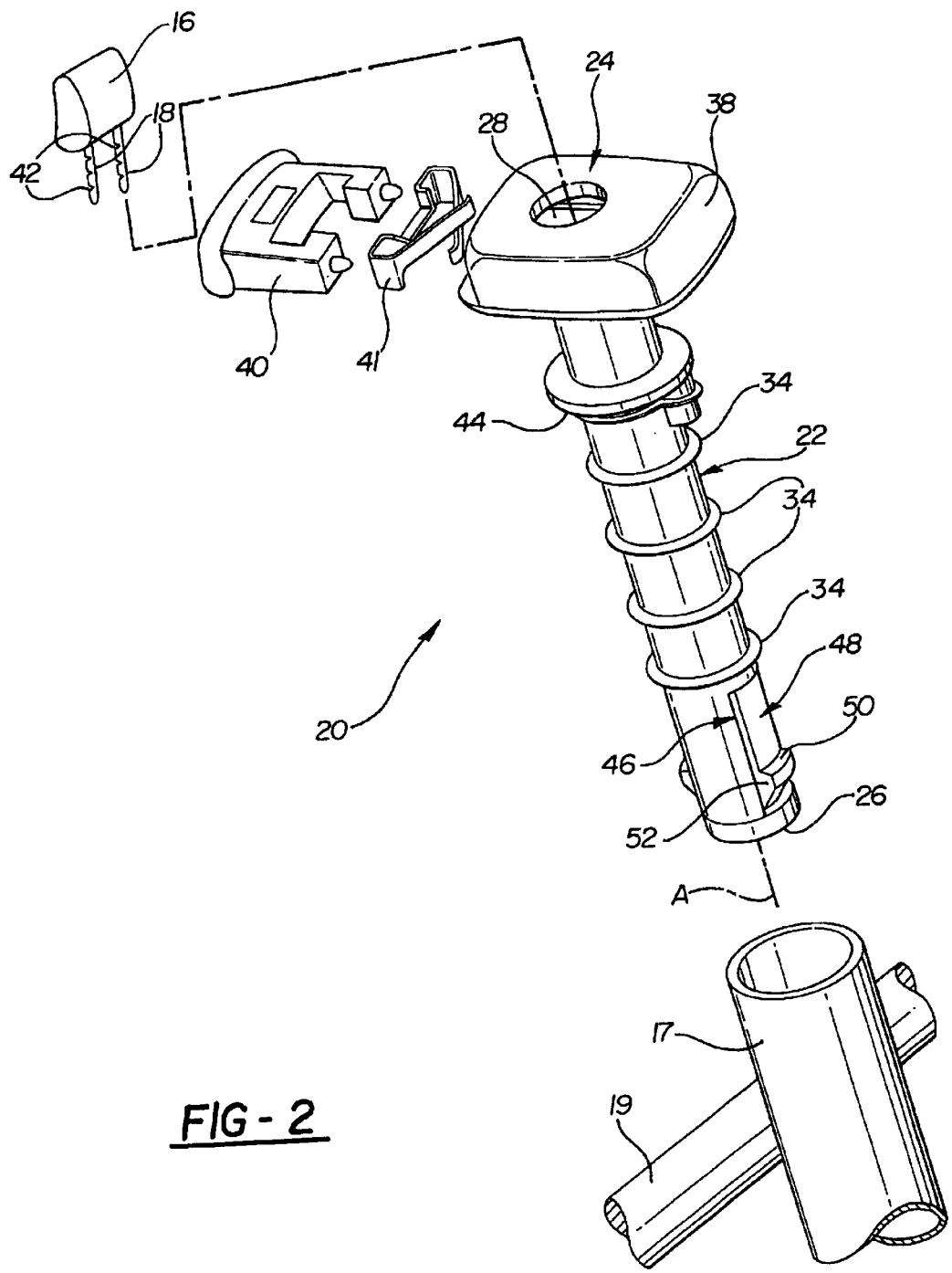
FIG. 2 is a perspective view of the head restraint guide sleeve.

Referring to FIGS. 1, 2, and 3, a head restraint guide sleeve 20 is shown for adjustably supporting the posts 18 within the guide tubes 17. The guide sleeve 20 includes a generally cylindrical body 22 extending between an upper end 24 and an opposite lower end 26. The body 22 and lower end 26 of the guide sleeve 20 are supported and locked in the guide tube 17. A bore 28 defined by generally cylindrical inner walls 30 extends longitudinally along an axis A through the guide sleeve 20 between the upper and lower ends 24, 26 for slidably receiving the guide post 18 of the head restraint 16 therethrough. As best shown in FIG. 4, a plurality of inner ribs 32 project radially inwardly from the inner walls 30 of the bore 28 and longitudinally along the body 22 generally parallel to axis A for minimizing buzzing or rattling noises due to intermittent contact between the guide post 18 and the guide sleeve 20, particularly when the vehicle is driven.

A plurality of rings or ring-shaped outer ribs 34 each projects circumferentially from the body 22 and are generally normal to axis A. The outer ribs 34 are deformable to provide a soft interference fit between the guide sleeve 20 and the guide tube 17 for minimizing buzzing or rattling noises due to intermittent contact between the guide sleeve 20 and the guide tube 17. The outer ribs 34 are deformable against the inner walls of the guide tube 17 during insertion of the guide sleeve 20 into the guide tube 17 without affecting the dimensions of inner walls 30 of the bore 28.

A head portion 38 defines the upper end 24 of the guide sleeve 20 for housing a button 40. The button 40 is lockably engagable with any one of a plurality of notches 42 formed longitudinally along the guide post 18 to maintain the head restraint 16 in any one of the corresponding plurality of head supporting positions relative to the seat back 14. The button 40 is operatively coupled to the head portion 38 for providing movement of the button 40 in and out of locking engagement with the notches 42 of the guide post 18. A biasing member 41 biases the button 40 towards engagement with the notches 42 of the guide post 18.

An upper locking edge 44 projects radially outwardly from the body 22 near the head portion 38 for locating the guide sleeve 20 against the top of the guide tube 17.

A symmetrically opposite pair of longitudinal openings 46 are formed adjacent the lower end 26 of the guide sleeve 20. A locking tab 48 extends cantilevered from the upper edge of each opening 46 to present a lower locking edge 50 opposing the upper locking edge 44. Each locking tab 48 also includes a ramped portion 52 that tapers from the locking edge 50 towards the lower end 26.

In use, the guide sleeve 20 is inserted through the guide tube 17. As the lower end 26 is inserted into the guide tube 17, the locking tabs 48 are elastically and inwardly deformed by sliding contact between the inner walls of the guide tube 17 and the ramped portion 52 of the locking tab 48. Once the ramped portions 52 of the locking tabs 48 move past the end of the guide tube 17, the upper and lower locking edges 44, 50 locate against the opposite ends of the guide tube 17 to axially lock the guide sleeve 20 in the guide tube 17. Further, the outer ribs 34 deform against the inner walls of the guide tube 17 without affecting the dimension of the inner walls 30 of the bore 28 and the inner ribs 32 projecting from the inner walls 30.

Each guide post 18 of the head restraint 16 is inserted into the bore 28 of one of the respective guide sleeves 20 until the button 40 lockingly engages the first of the plurality of notches 42 in the guide post 18. The button 40 is pressed against the force applied by the biasing member 41 to allow adjustment of the head restraint 16 between the plurality of head supporting positions. The button 40 is released to allow the button 40 to re-engage the notch 42 corresponding to the desired head supporting position.

Alternatively, the guide sleeve 20 may be inserted through a flanged hole formed in the upper cross member 19 by a punching operation. The upper and lower locking edges 44, 50 locate against opposite top and bottom surfaces of the upper cross member 19. The outer ribs 34 deform against the flanged portion of the hole.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A guide sleeve for receiving and supporting a guide post of a head restraint within a seat back frame of a seat assembly, said guide sleeve comprising:
   a body extending longitudinally between opposite upper and lower ends;
   a bore defined by cylindrical inner walls extending between said upper and lower ends of said body for slidably receiving the guide post therethrough for allowing selective adjustment of the head restraint relative to the seat back between a plurality of head supporting positions;
   a plurality of rings each projecting circumferentially outwardly from the body and deformable against the seat back frame during insertion of said guide sleeve into a hole formed in the seat back frame for creating an interference fit between said guide sleeve and the seat back frame without deforming said inner walls of said bore, and thereby, not increasing efforts required to slide the guide post through said bore during movement of the head restraint between the plurality of head supporting positions;
   an upper locking edge for locating said guide sleeve against the top of the seat back frame during insertion of said guide sleeve in the hole in the seat back frame; and
   an opening and a locking tab cantilevered from an edge of said opening and having a lower locking edge formed therein opposing said upper locking edge for locking said guide sleeve with the hole in the seat back frame, said locking tab including a ramped portion engagable with the seat back frame during insertion of said guide sleeve into the hole in the seat back frame, whereby said locking tab is elastically displaced into said opening to facilitate insertion of said guide sleeve into the hole of the seat back frame.

2. The guide sleeve as set forth in claim 1 wherein said ramped portion tapers between said lower locking edge and said lower end for engaging the seat back frame during insertion of said guide sleeve into the hole in the seat back frame, whereby said locking tab is elastically displaced into said opening to facilitate insertion of said guide sleeve into the bore of the seat back frame.

3. The guide sleeve as set forth in claim 2 wherein said bore includes a plurality of inner ribs extending inwardly from said cylindrical inner walls of said bore and aligned longitudinally between said upper and lower ends to minimize rattling between said guide sleeve and the guide post.

4. The guide sleeve as set forth in claim 3 including a button lockably engagable with any one of a plurality of notches formed longitudinally along the guide post to maintain the head restraint in any one of the corresponding plurality of head supporting positions and operatively coupled with said guide sleeve for movement in and out of locking engagement with any one of the plurality of notches in the guide post.

5. The guide sleeve as set forth in claim 4 including a head portion defining said upper end of said guide sleeve and operatively coupled with said button for providing movement of said button in and out of locking engagement with the any one of the plurality of notches in the guide post.

6. The guide sleeve as set forth in claim 5 including a biasing member extending between said button and said head portion for biasing said button towards locking engagement with the notches in the guide post.

\* \* \* \* \*

UNITED STATES PATENT AND TRADEMARK OFFICE
CERTIFICATE OF CORRECTION

PATENT NO. : 6,761,409 B2
DATED : July 13, 2004
INVENTOR(S) : John R. Ford

It is certified that error appears in the above-identified patent and that said Letters Patent is hereby corrected as shown below:

<u>Title page,</u>
Item [57], ABSTRACT,
Line 1, "bead restraint" should be -- head restraint --.
Line 4, "A bare defined …" should be -- a bore defined … --.

Signed and Sealed this

Sixteenth Day of November, 2004

JON W. DUDAS
*Director of the United States Patent and Trademark Office*